(12) United States Patent
Brandt

(10) Patent No.: US 11,732,840 B2
(45) Date of Patent: Aug. 22, 2023

(54) MOUNTING APPARATUS FOR AN ELECTRONIC DEVICE

(71) Applicant: Havis, Inc., Warminster, PA (US)

(72) Inventor: Jamie Brandt, Fairbault, MN (US)

(73) Assignee: Havis, Inc., Warminster, PA (US)

( * ) Notice: Subject to any disclaimer, the term of this patent is extended or adjusted under 35 U.S.C. 154(b) by 0 days.

(21) Appl. No.: 18/070,650

(22) Filed: Nov. 29, 2022

(65) Prior Publication Data

US 2023/0118215 A1 Apr. 20, 2023

Related U.S. Application Data

(63) Continuation of application No. 17/221,040, filed on Apr. 2, 2021, now Pat. No. 11,592,141.

(51) Int. Cl.
*F16M 13/02* (2006.01)
*F16C 11/06* (2006.01)
*F16C 11/10* (2006.01)

(52) U.S. Cl.
CPC ....... *F16M 13/022* (2013.01); *F16C 11/0685* (2013.01); *F16C 11/106* (2013.01)

(58) Field of Classification Search
None
See application file for complete search history.

(56) References Cited

U.S. PATENT DOCUMENTS

| | | | |
|---|---|---|---|
| 2,898,068 A | 8/1959 | Warren | |
| 4,647,434 A | 3/1987 | Ayers et al. | |
| 4,936,533 A * | 6/1990 | Adams | B60R 1/04 248/222.13 |
| 5,128,841 A * | 7/1992 | Maglica | F21L 15/08 362/421 |
| 5,664,750 A * | 9/1997 | Cohen | F16M 11/041 248/231.71 |
| 6,138,970 A | 10/2000 | Sohrt et al. | |
| 6,220,556 B1 | 4/2001 | Sohrt et al. | |
| 6,347,776 B1 | 2/2002 | Chuang | |
| 6,601,813 B1 | 8/2003 | Kager et al. | |
| 7,000,878 B2 * | 2/2006 | Lin | F16M 11/2078 248/276.1 |
| 7,017,243 B2 | 3/2006 | Carnevali | |
| 7,040,590 B2 | 5/2006 | Carnevali | |

(Continued)

FOREIGN PATENT DOCUMENTS

| | | |
|---|---|---|
| EP | 1111290 A1 | 6/2001 |
| WO | 2015000251 A1 | 1/2015 |
| WO | 2017004072 A1 | 1/2017 |

OTHER PUBLICATIONS

International Search Report and Written Opinion for International Application No. PCT/US2022/023001, dated Jul. 12, 2022, 16 pages.

(Continued)

*Primary Examiner* — Monica E Millner
(74) *Attorney, Agent, or Firm* — RatnerPrestia

(57) ABSTRACT

An adjustable mounting apparatus for electronic devices is configured to be adaptable to various support structures, and to facilitate a customized mount orientation for the electronic devices through several degrees of pivot freedom. The mounting apparatus is particularly adaptable to outdoor or industrial environments in which standard support structure modalities may not be available.

8 Claims, 13 Drawing Sheets

(56) References Cited

U.S. PATENT DOCUMENTS

| | | |
|---|---|---|
| 7,100,881 B2 | 9/2006 | Worrall |
| 7,523,528 B2 | 4/2009 | Carnevali |
| 7,823,844 B2 | 11/2010 | Carnevali |
| 8,074,951 B2 | 12/2011 | Carnevali |
| 8,186,636 B2 | 5/2012 | Carnevali |
| 9,016,645 B2 * | 4/2015 | Simpson ................ H04R 1/026 |
| | | 248/292.12 |
| 9,188,280 B2 | 11/2015 | Congdon |
| 9,255,660 B2 | 2/2016 | Zhang |
| 9,568,145 B2 | 2/2017 | Carnevali |
| 9,776,577 B2 | 10/2017 | Carnevali |
| 9,945,159 B2 | 4/2018 | Carnevali |
| 9,966,649 B2 * | 5/2018 | Christie ................ H01Q 1/125 |
| 10,555,059 B2 * | 2/2020 | Nicolas ................ F16C 11/106 |
| 10,797,380 B2 | 10/2020 | Roy et al. |
| D928,220 S * | 8/2021 | Liang ........................... D8/382 |
| 2001/0023915 A1 * | 9/2001 | Hailson ................ F16C 11/106 |
| | | 248/288.11 |
| 2003/0098401 A1 * | 5/2003 | Carnevali ............. F16M 11/14 |
| | | 248/276.1 |
| 2003/0129019 A1 | 7/2003 | Callaway et al. |
| 2006/0237608 A1 * | 10/2006 | Hanson ............. F16M 11/2064 |
| | | 248/276.1 |
| 2007/0034753 A1 | 2/2007 | Lee |
| 2008/0087783 A1 * | 4/2008 | Istas ....................... F16M 13/02 |
| | | 248/220.21 |
| 2008/0265111 A1 * | 10/2008 | Darrow ................ G03B 17/561 |
| | | 396/428 |
| 2013/0221182 A1 * | 8/2013 | Renilson ................ H01Q 1/125 |
| | | 29/527.5 |
| 2014/0346294 A1 * | 11/2014 | Lewry ................... H01Q 1/125 |
| | | 248/201 |
| 2015/0358044 A1 | 12/2015 | Barstead |
| 2016/0294036 A1 | 10/2016 | Christie |
| 2016/0322697 A1 | 11/2016 | Skrepeinski et al. |
| 2018/0321573 A1 * | 11/2018 | Prichard ............ F16M 11/2085 |
| 2018/0343510 A1 * | 11/2018 | Nicolas ................. H04R 1/026 |
| 2019/0086027 A1 * | 3/2019 | Johnson .................. F16B 2/065 |
| 2019/0113072 A1 | 4/2019 | Chijoff et al. |
| 2020/0119537 A1 * | 4/2020 | Heath ...................... H02G 7/20 |
| 2020/0166385 A1 * | 5/2020 | Jiang ...................... F16M 11/14 |

OTHER PUBLICATIONS

Entire patent prosecution history of U.S. Appl. No. 17/221,040, filed Apr. 2, 2021, entitled, "Mounting Apparatus for an Electronic Device."

* cited by examiner

MOUNTING APPARATUS FOR AN ELECTRONIC DEVICE

This application is a continuation of U.S. patent application Ser. No. 17/221,040, filed on Apr. 2, 2021, which is incorporated herein by reference.

FIELD OF THE INVENTION

The present invention relates to mounting apparatus generally, and more particularly to mounting apparatus for securing one or more electronic devices to a base member, such as a post. The mounting apparatus is adjustable about and along several axis for customization of a view angle to the mounted electronic device. In some embodiments, the mounting apparatus is adapted for use in connection with mobile vehicles, including agricultural and industrial vehicles.

BACKGROUND OF THE INVENTION

As electronic devices have found valuable use in a wide variety of applications and physical settings, mounting apparatus that is specifically configured for the electronic devices can enable efficient user interaction therewith. Example electronic devices that may be used in connection with mounting apparatus include tablet computers, cellular phones, payment terminals, and computer monitors. While many electronic device mounting systems have been introduced over the recent years, many are deficient in their adjustability and adaptability for connection to various support members.

A particular physical setting that requires substantial adjustability and adaptability is in outdoor or industrial workplace environments, such as in connection with warehouses, storage equipment, motorized vehicles, and the like. The support structures to which electronic device mounting apparatus may be secured in these environments are varied, and may include "posts" that broadly defines rails, railings, uprights, beams, studs, rods, and the like. An example "post" as used herein may be a roll cage member of a fork lift or skid steer vehicle. Because the posts encountered in outdoor an industrial workplace environments have various sizes, shapes, and orientations, a need exists for electronic device mounting apparatus to be adaptable for connection thereto, as well as to be highly adjustable to facilitate the most efficient user interaction possible when the apparatus is connected to the posts.

SUMMARY OF THE INVENTION

By means of the present invention, electronic devices may be adjustably mounted in a variety of physical settings. The adjustable mounting apparatus of the present invention is capable of mounting to posts of various dimension and shape, and facilitates adjustment of a mounting orientation about and along a plurality of axes.

In one embodiment, the adjustable mounting apparatus of the present invention includes an arm that extends between a first pivot joint and a second pivot joint, wherein the first pivot joint is rotatably connected about a first pivot axis to a mount having a first mount body that is separate from and fastenable to a second mount body. Each of the first and second mount bodies have a brace surface and a generally opposed outer surface that defines a mount body thickness therebetween, and a length axis and a perpendicular width axis. The first and second mount bodies each include a slotted opening that is configured to receive a fastener therein to thereby fasten the first and second bodies to a post. The slotted opening defines a path along which the fastener is adjustably positionable, with at least a portion of the path being oriented skew with respect to both the length axis and the width axis. The first pivot joint further includes a first multiple-axis gimbal that is adjustable between a free condition that permits movement about the first gimbal multiple axes, and a locked condition that restricts movement about the first gimbal multiple axes. The first gimbal supports the arm for coordinated movement therewith. The second pivot joint is rotatably connected about a second pivot axis to a base plate that is specifically configured for removable connection to the electronic device. The second pivot joint further includes a second multiple axis gimbal that is adjustable between a free condition that permits movement about the second gimbal multiple axes, and a locked condition that restricts movement about the second gimbal multiple axis. The second gimbal supports the arm for coordinated movement therewith.

The first pivot joint may be selectively indexable into discrete rotatable positions about the first pivot axis. The second pivot joint may be selectively indexable into discrete rotatable positions about the second pivot axis. The first and second pivot axes may be parallel or skew with respect to one another. The arm may be extendable to adjust a spacing dimension between the first and second pivot joints.

In some embodiments, the brace surface may be relatively soft to enhance engagement with the post. The surface may also be adapted to minimize the transmission of vibration to the connected electronic device. The surface may therefore act as a vibration dampener. The brace surface may exhibit a hardness of between 90 Shore A and 70 Shore D. At least a portion of the mount bodies, including the brace surfaces, may include an elastomer material. Other vibration dampening materials, however, are contemplated as being useful for the brace surfaces and possibly other portions of the mount bodies.

The adjustable mounting apparatus may include a plurality of slotted openings in each of the first and second mount bodies, with respective sets of slotted openings being arranged at the first and second mount bodies to receive one of a plurality of fasteners therein to thereby fasten the first and second bodies to the post, wherein the first and second bodies are positionable to sandwich the post. The length axis defines a length of each of the first and second mount bodies, and the width axis defines a width of each of the first and second mount bodies. The length may be greater than the width, and the length axis and the width axis may together define quadrants of each of the first and second mount bodies. At least one slotted opening may be positioned in each of the quadrants of each of the first and second mount bodies.

In some embodiments, a second arm extends between a third pivot joint and a fourth pivot joint, wherein the third pivot joint is rotatably connected about a third pivot axis to the mount. The first pivot joint may be rotatably connected to the first mount body, and the third pivot joint may be rotatably connected to the second mount body.

An electronic device may be secured to the adjustable mounting apparatus by positioning the first and second bodies to sandwich or bracket the post, and connecting the fasteners to respective sets of the slotted openings of the first and second mount bodies to thereby fasten the first and second bodies to the post. The electronic device may be connected to the adjustable mounting apparatus, which may be compliant with one or more of AMPS standard and VESA standard mounting arrays.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

An adjustable mounting apparatus as described herein includes the basic elements of pivot joints connected by an arm. With adjustability to each element, the mounting apparatus gains several degrees of freedom of movement for superior customizability of the positioning and orientation of the electronic device. The apparatus is securable to a support structure through a mount, which itself is adjustable to accommodate support structures of various size and configuration.

Figure 1:
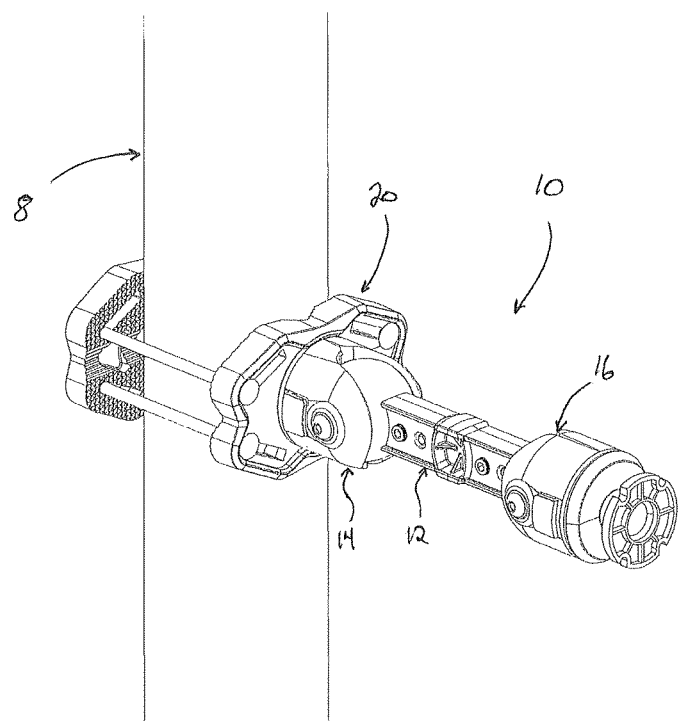
FIG. 1 is an illustration of a mounting apparatus of the present invention secured to a post.
Figure 2:
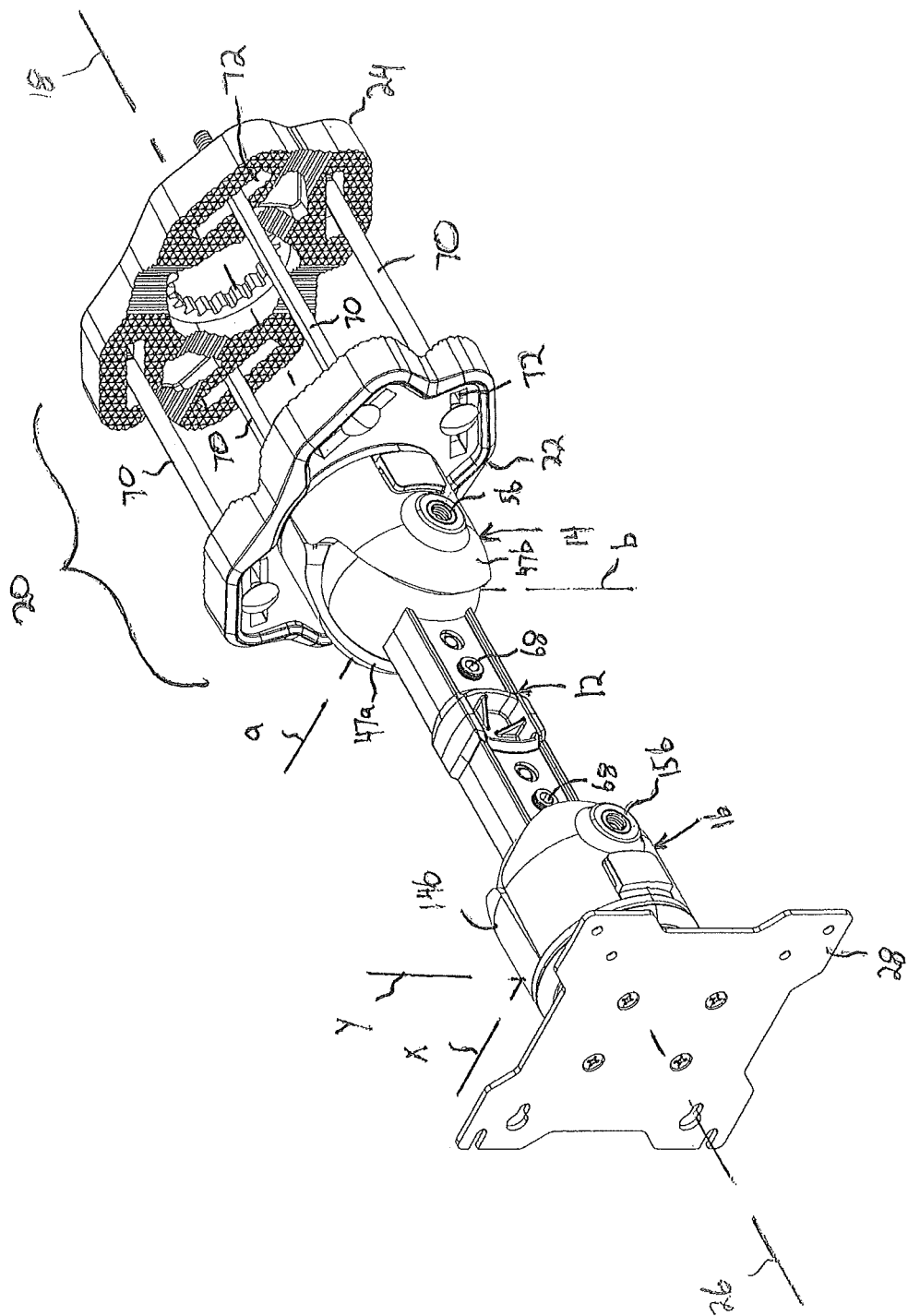
FIG. 2 is an illustration of a mounting apparatus of the present invention.
Figure 3:
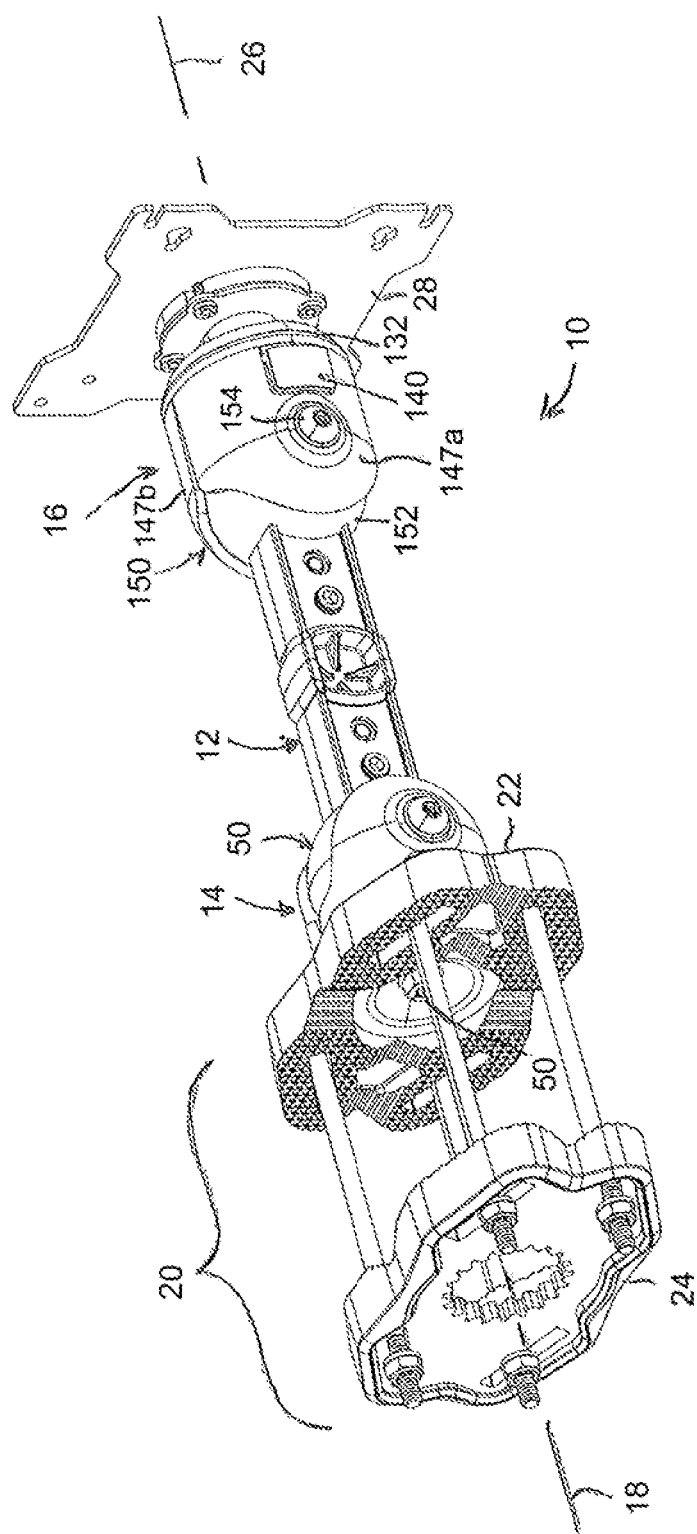
FIG. 3 is an illustration of a mounting apparatus of the present invention.

A mounting apparatus 10 of the present invention is illustrated in FIG. 1 as being secured to a post 8. As described herein, the term "post" is intended to be broadly construed to mean a structure that may be interposed between opposed bodies. Example posts include poles, rails, rods, railings, uprights, beams, studs, platforms, shelves, panels, walls, handles, hooks, and the like. In the illustrated embodiment, post 8 may form a portion of a frame structure in an industrial work environment.

Mounting apparatus 10 includes a first arm 12 extending between a first pivot joint 14 and a second pivot joint 16. First pivot joint 14 is rotatably connected about a first pivot axis 18 to a mount 20 having a first mount body 22 that is separate from and fastenable to a second mount body 24. Second pivot joint 16 is rotatably connected about a second pivot axis 26, optionally to a base plate 28 that may be specifically configured for removable connection to an electronic device 30. In some embodiments, the electronic device 30 may be removably connected to second pivot joint 16 without base plate 28, such as via an adaptor as described in greater detail below.

Figure 4:
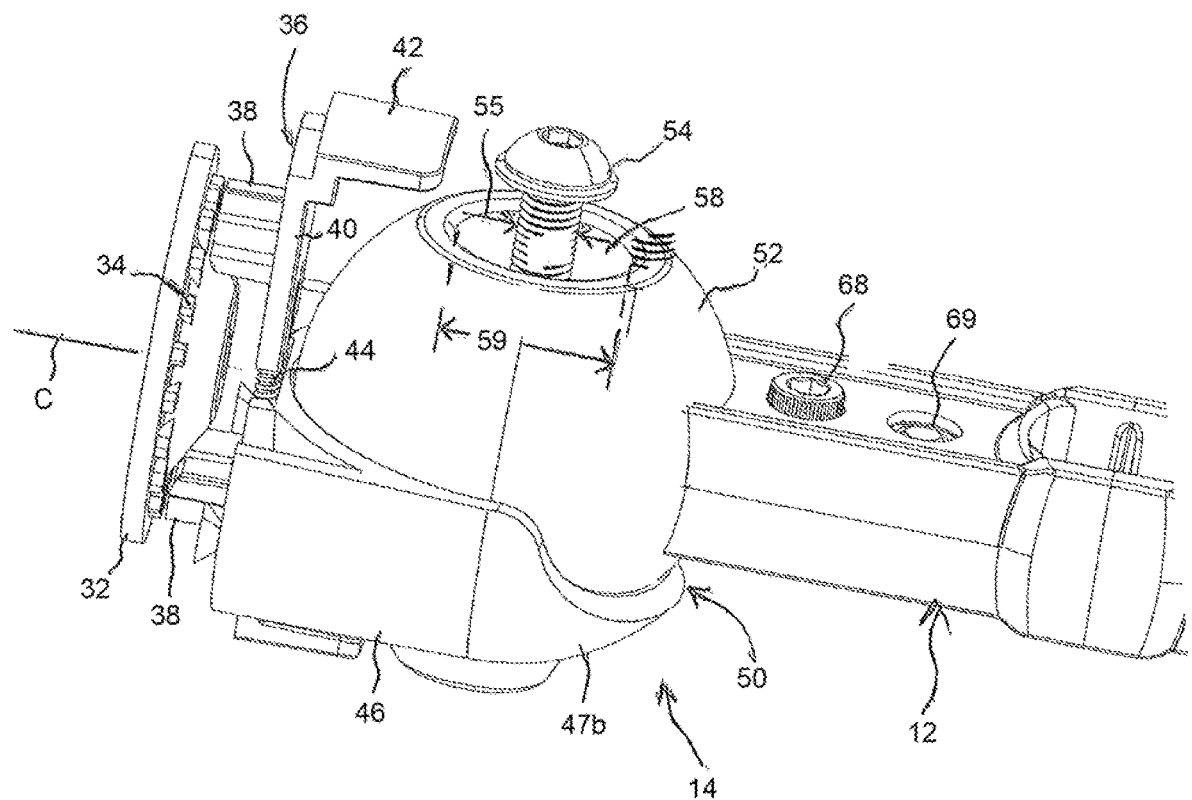
FIG. 4 is a partial cut-away view of a portion of a mounting apparatus of the present invention.
Figure 5:
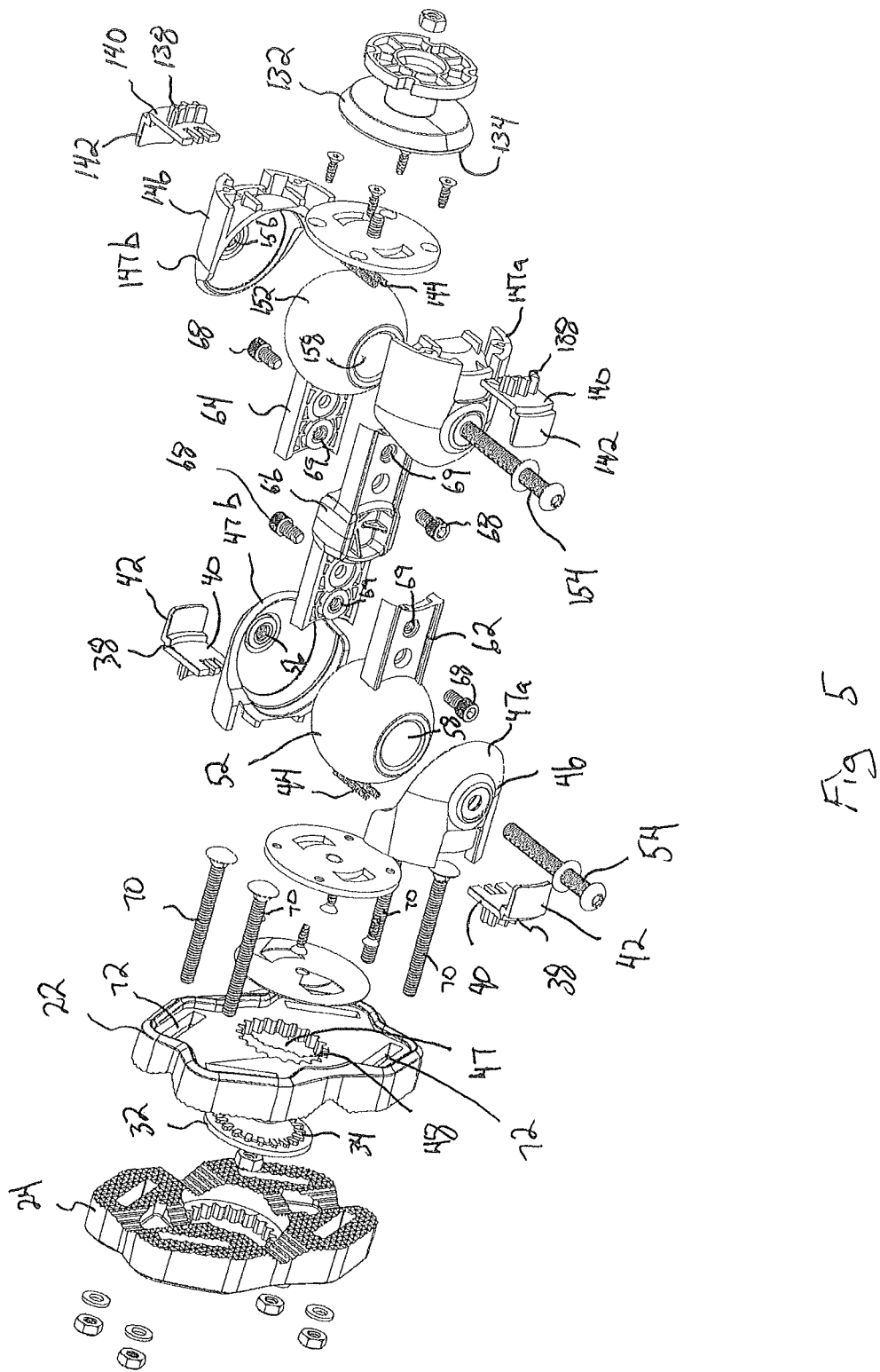
FIG. 5 is an exploded view of a mounting apparatus of the present invention.
Figure 6:
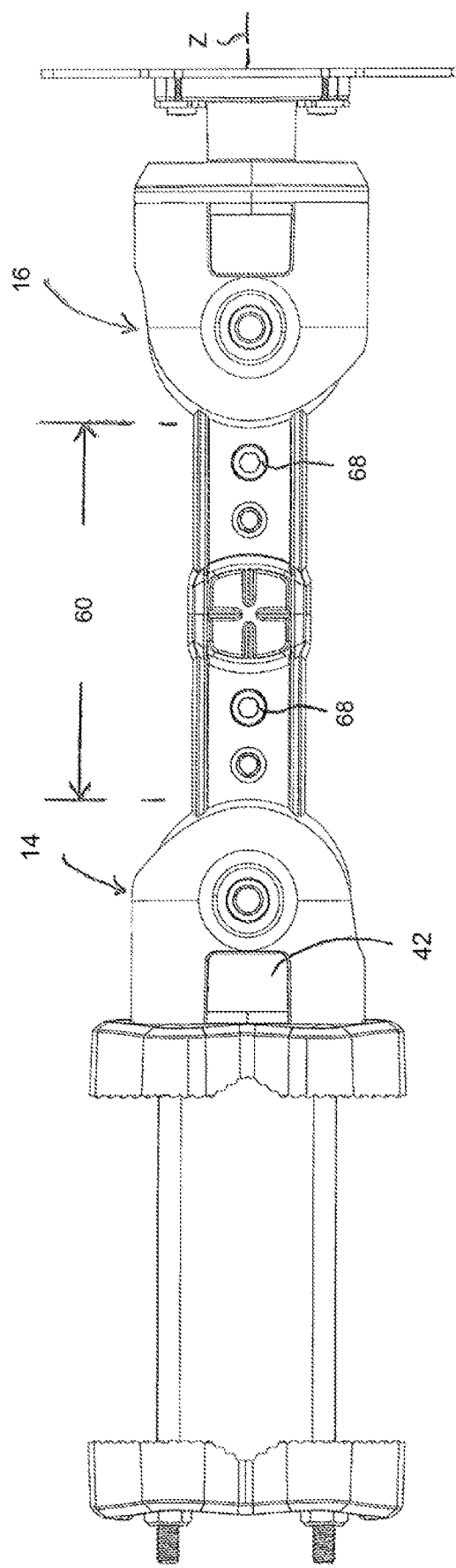
FIG. 6 is an illustration of a mounting apparatus of the present invention.
Figure 7:
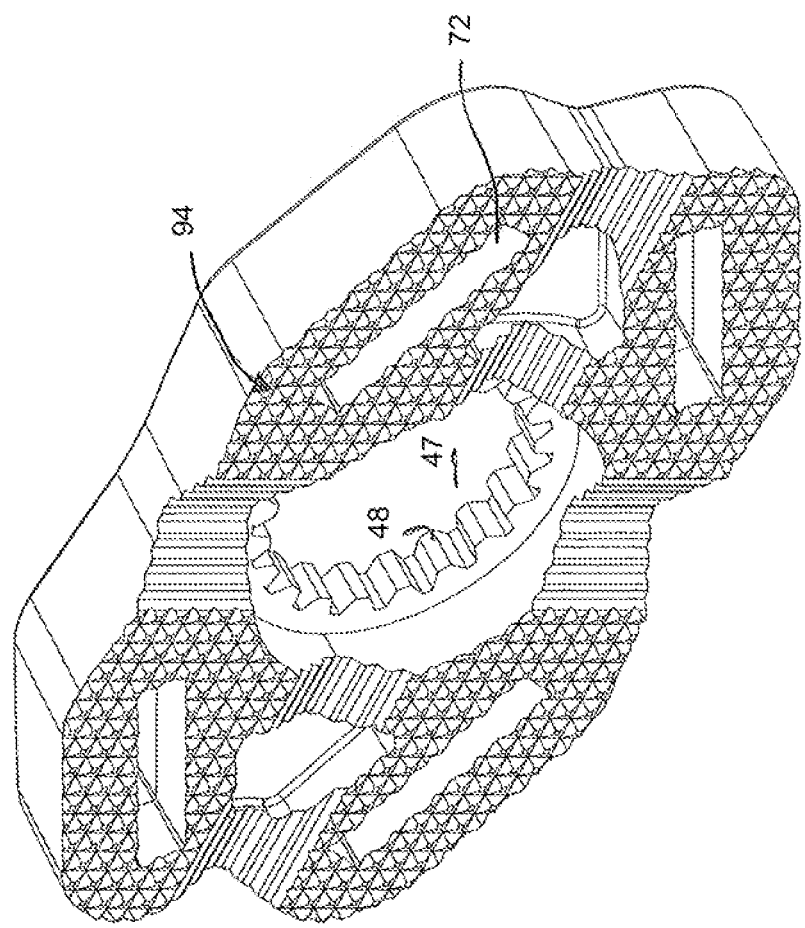
FIG. 7 is a perspective view of a portion of a mounting apparatus of the present invention.
Figure 8:
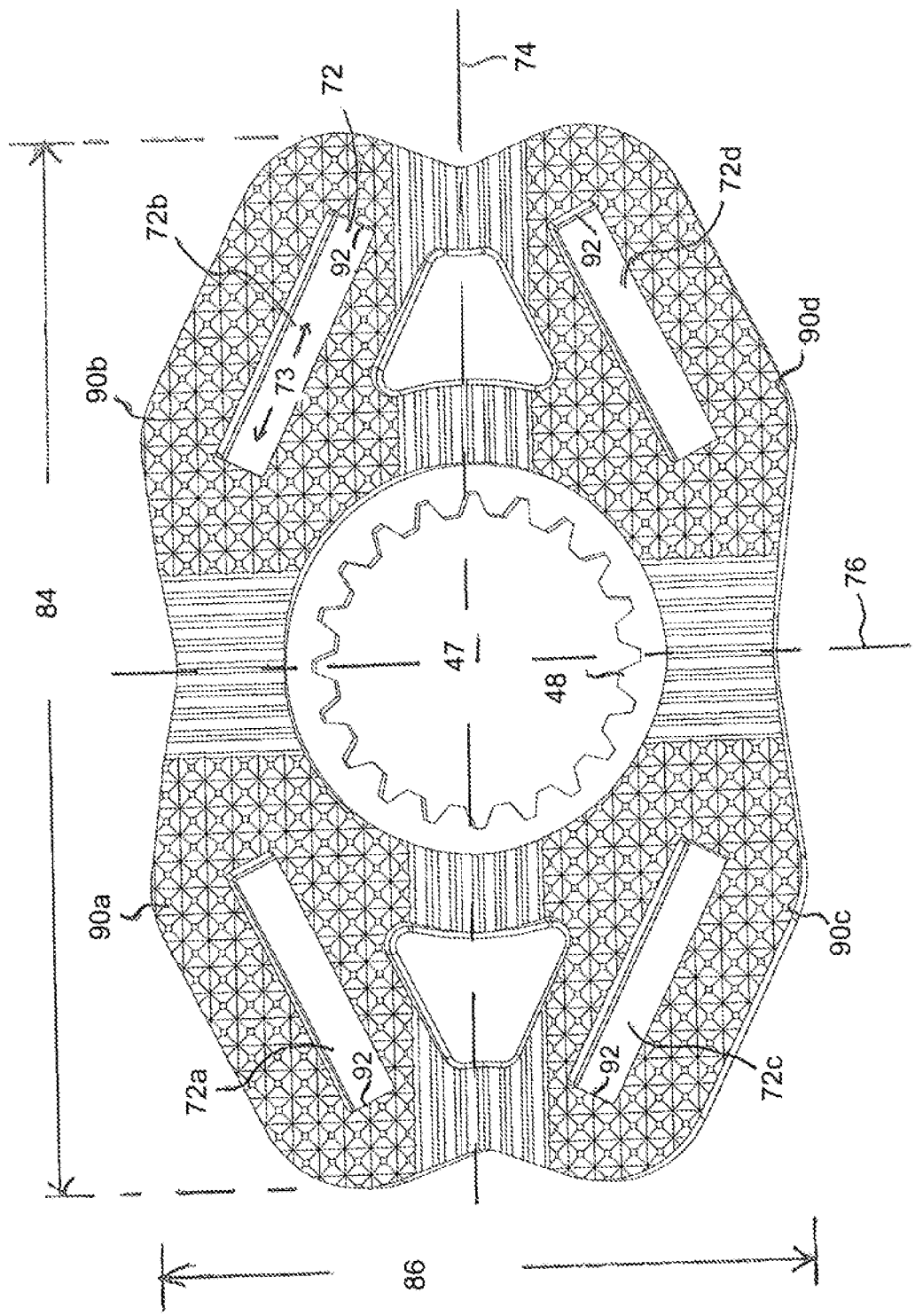
FIG. 8 is an elevation view of the portion of the mounting apparatus illustrated in FIG. 7.
Figure 9:
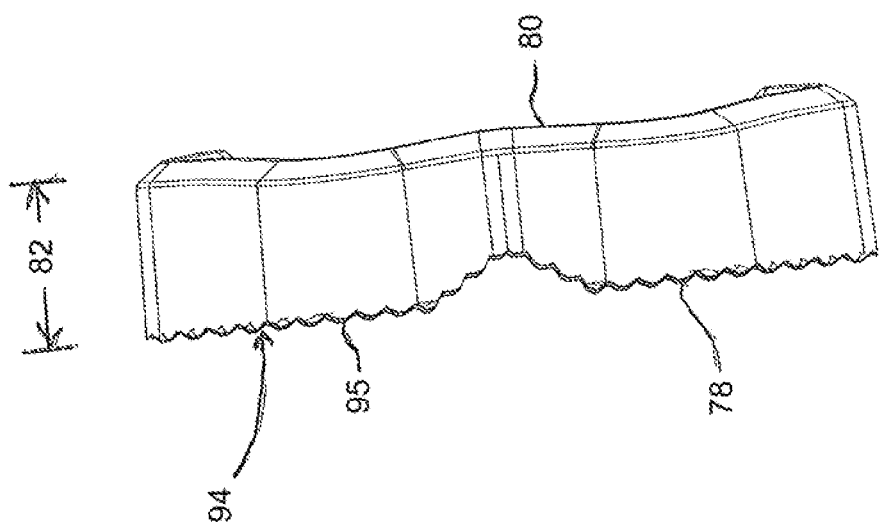
FIG. 9 is a side elevation view of the portion of the mounting apparatus illustrated in FIGS. 7 and 8.
Figure 10:
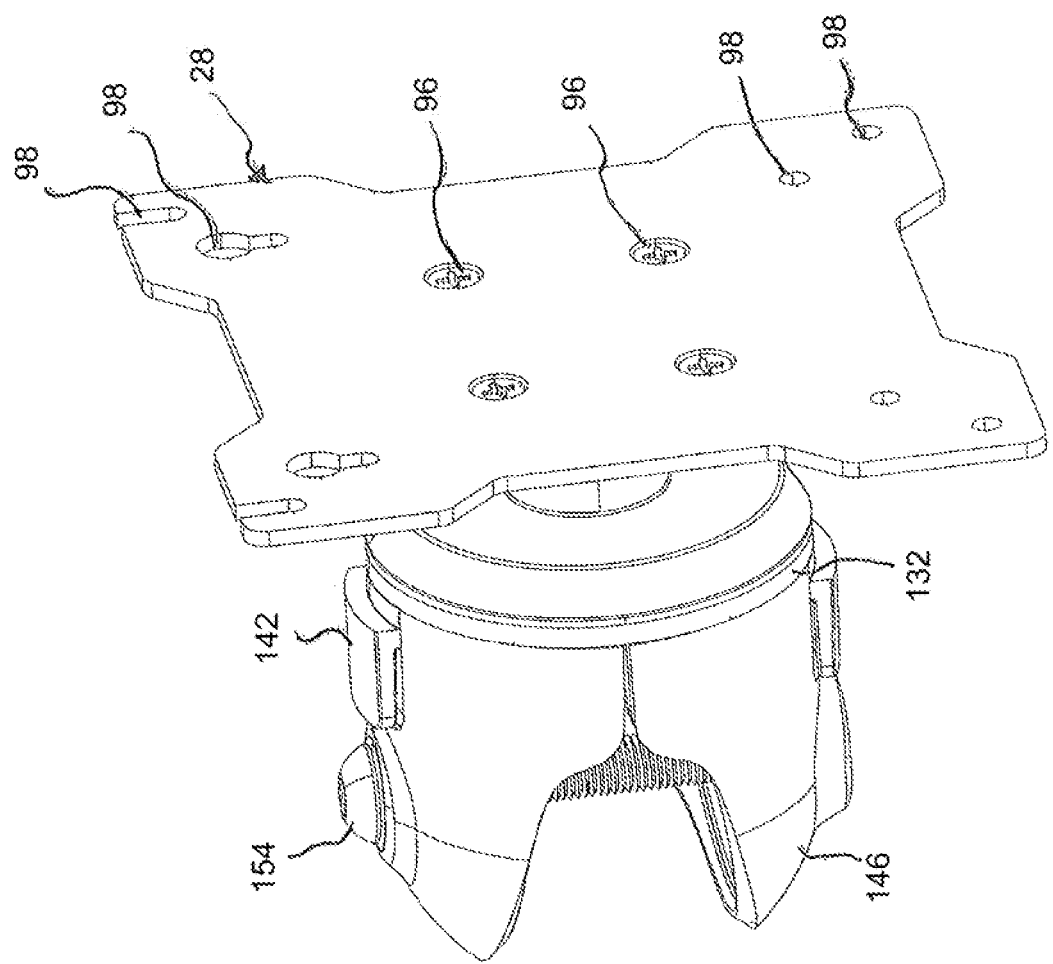
FIG. 10 is an illustration of a portion of a mounting apparatus of the present invention.

First pivot joint 14 is best illustrated in FIG. 4 and the exploded view of FIG. 5. First pivot joint 14 coordinates with first mount body 22 having an opening perimeter 48 that surrounds opening 45. Opening perimeter 48 is preferably provided with circumaxial recesses 48a. An indexing device 36 includes lock gears 38 that are selectively intermeshible with the array of circumaxial recesses 48a in opening perimeter 48 to index first pivot joint 14 into discrete rotatable positions about first pivot axis 18. Indexing device includes release members 40 with buttons 42 to actuate lock gears 38 out from intermeshing engagement with circumaxial recesses 48a, thereby permitting rotation of first pivot joint 14 about first pivot axis 18 with respect to first mount body 22. In the illustrated embodiment, release members 40 may be selectively actuated by depressing buttons 42 radially inwardly against a bias force generated by spring 44. Movement of release members carries with them lock gears 38, which are connected to or integrally formed with release members 40. Although two release members 40 are illustrated in the example embodiment, it is contemplated that only a single release member 40 is required to engage and disengage from first mount body 22.

When lock gears 38 are intermeshed with circumaxial recesses 48a, first pivot joint 14 is locked from relative rotation with first mount body 22. Release of lock gears 38 from engagement with circumaxial recesses 48a frees first pivot joint 14 to rotate about first pivot axis 18 with respect to first mount body 22. Release members 40 may be guided to an extent by first pivot housing 46, which will be described in greater detail hereinbelow.

A gear plate 32 having a plurality of gear teeth 34 circumaxially arranged about a central axis of gear plate 32, which central axis is coextensive with first pivot axis 18. Gear plate 32 may be secured to first mount body 22 in fixed relationship therewith, wherein gear teeth 34 intermesh with circumaxial recesses 48a such that rotational movement of first pivot joint 14 relative to first mount body 22 correspondingly results in rotational movement of first pivot joint 14 relative to gear plate 32. Gear plate 32 may be rotatably secured to pivot housing 46 via a connector 49 that may permit rotation with a slip washer, a bearing, or other known rotation means about a shaft. Connector secures gear plate 32 and pivot housing 46 to first mount body 22.

First pivot joint 14 further includes a first multiple-axis gimbal 50 for rotation about first gimbal axes, such as axes a, b, c. First gimbal 50 may be in the form of a ball and socket joint, with ball 52 pivotally secured at least partially within pivot housing 46. In preferred embodiments, pivot housing 46 includes first and second shell portions 47a, 47b that are secured together with a bolt or locking shaft 54. In this manner, an engagement between ball 52 and pivot housing 46 may be adjusted by tightening or loosening bolt 54. Frictional resistance to pivoting movement of ball 52 with respect to pivot housing 46 may accordingly be selectively adjusted by the user. Preferably, bolt 54 threadably engages with threaded opening 56 in second shell portion 47a, 47b to move first and second shell portions 47a, 47b with respect to one another, and to correspondingly adjust the frictional resistance to pivotal movement of ball 52 with respect to pivot housing 46. Frictional resistance may be adjusted to an extent to which spontaneous movement of ball 52 with respect to pivot housing 46 under gravitational force is prevented. This locking mechanism is preferably effective even when an electronic device is mounted at base plate 28. In some embodiments, frictional resistance may be adjusted to an extent to which movement of ball 52 with respect to pivot housing 46 under even moderate externally-applied force, such as from an external impact, is prevented. The extent of frictional resistance is preferably adjustable by the user through adjustment of bolt 54 received at threaded opening 56.

The pivoting degrees of freedom of ball 52 in pivot housing 46 is further enabled by bore 58, which has a cross-sectional diameter 59 that is substantially greater than bolt shaft diameter 55. The resultant space between bolt 54 and ball 52 in bore 58 permits multiple degrees of pivoting freedom of ball 52 with respect to pivot housing 46. In particular, first gimbal 50 may be selectively permitted to pivot about multiple axes, including orthogonal first gimbal axes a, b, c. Through the relationship of ball 52, bolt 54, and pivot housing 46, first gimbal 50 may be selectively adjusted between a free condition that permits movement about multiple first gimbal axes, and a locked condition that restricts movement about the first gimbal axes. As described above, the locked condition may prevent movement about one or more of the first gimbal axes.

Arm 12 may be connected to or integrally formed with ball 52 of first pivot joint 14. Arm 12 may be extendable to adjust a spacing dimension 60 between first and second pivot joints 14, 16. Arm 12 may include a first stub section 62 connected to or integrally formed with ball 52 of first pivot joint 14, a second stub section 64 connected to or integrally formed with ball 152 of second pivot joint 16, and a bridge section 66 that can connect first and second stub sections 62, 64 to one another. In some embodiments, first and second stub sections 62, 64 may be directly connectable to one another by omitting bridge section 66. Connecting screws 68 may be received in respective threaded openings 69 of first, second, and/or bridge sections 62, 64, 66 to selectively secure the arm sections to one another. The optional use of bridge section 66 forms the extendable capability of arm 12. It is contemplated that bridge section 66 may be a fixed configuration body, or may include one or more pivot joints to increase the adjustability of mounting apparatus 10.

Figure 13:
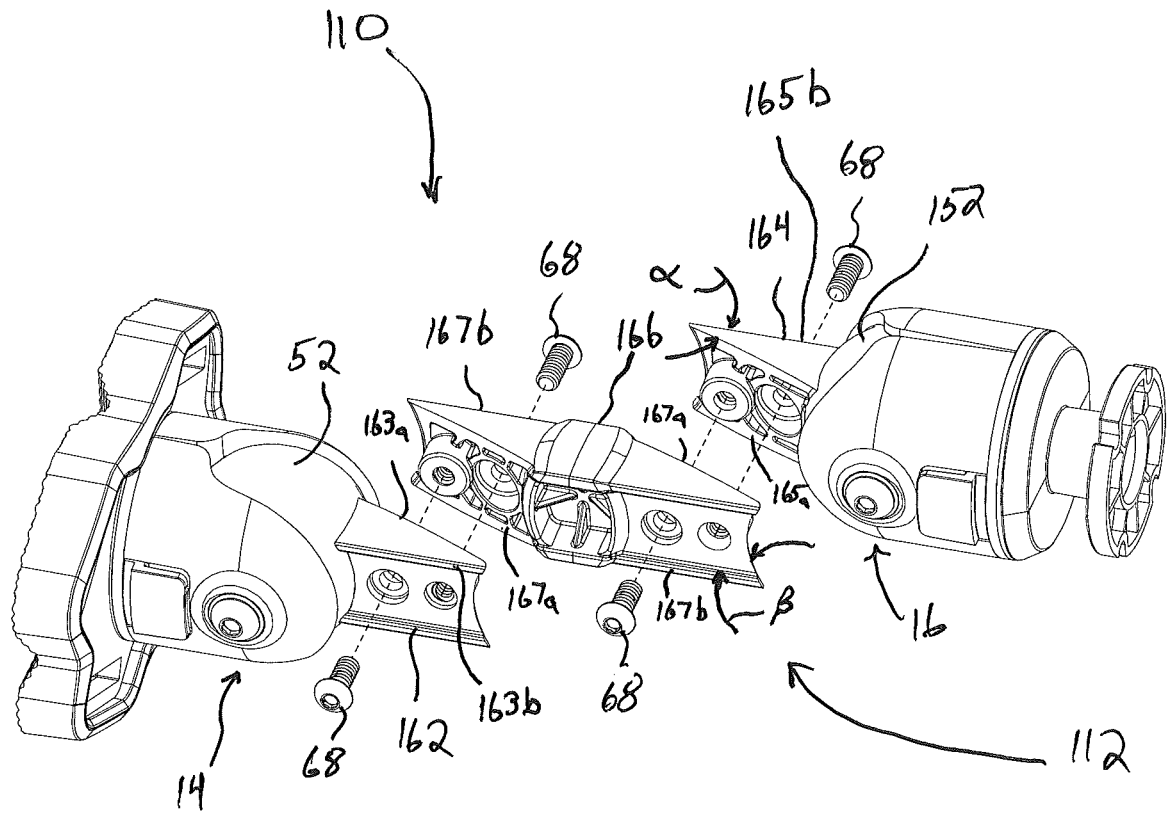
FIG. 13 is an illustration of a portion of a mounting apparatus of the present invention.

An alternative embodiment of arm 112 is illustrated in FIG. 13, in which arm 112 includes a first stub section 162 that may be connected to or integrally formed with ball 52 of first pivot joint 14, a second stub section 164 that may be connected to or integrally formed with ball 152 of second pivot joint 16, and a bridge section 166 that can connect first and second stub sections 162, 164 to one another. In some embodiments, first and second stub sections 162, 164 may be directly connectable to one another by omitting bridge section 166. Connecting screws 68 may be used to secure the arm sections to one another or to the bridge section 166. The optional use of bridge section 166 forms the extendable capability of arm 112. It is contemplated that bridge section 66 may be a fixed configuration body, or may include one or more pivot joints to increase the adjustability of mounting apparatus 110.

Arm 112 includes a configuration that may be optimized for strength properties. For example, first and second stub sections 162, 164 may each include a mount surface 163a, 165a that is angled (non-parallel) with respect to a second surface 163b, 165b thereof. In some embodiments, mount surface 163a, 165a may be angled by between 20-70°, and more preferably between 25-50° with respect to second surface 163b, 165b, as depicted by angle α. Mount surface 163a, 165a of each of first and second stub sections 162, 164 are preferably configured to engage one another in flush face-to-face relationship, and preferably so that second surfaces 163b, 165b are parallel to one another when first and second stub sections 162, 164 are secured together. Bridge section 166 of arm 112 preferably includes mount surfaces 167a and second surfaces 167b, wherein mount surfaces 167a coordinate with mount surfaces 163a, 165a of first and second stub sections 162, 164 for flush mounting to bridge section 166. Thus, mount surfaces 167a of bridge section 166 may be angled (non-parallel) with respect to second surfaces 167b thereof, as depicted by angle β. The angled mount surfaces 163a, 165a, 167a permit a relatively thick cross-sectional dimension of arm 112, which increases a strength characteristic, particularly where first and second stub sections 162, 164 are connected to respective first and second pivot joints 14, 16, as well as at bridge section 166.

Second pivot joint 16 may be configured similarly to first pivot joint 14 so that second pivot joint 16 enables independent rotation about second pivot axis 26. Second pivot joint 16 includes an adaptor body 132 that is selectively indexable into discrete rotatable positions about second pivot axis 26. Adaptor body 132 includes a plurality of gear teeth 134 circumaxially arranged about a central axis of adaptor body 132, which central axis is coextensive with second pivot axis 26. An indexing device 136 includes lock gears 138 that are selectively intermeshible with the array of gear teeth 134 to index adaptor body 132 of second pivot joint 16 into discrete rotatable positions about second pivot axis 26. Indexing device includes release members 140 with buttons 142 to actuate lock gears 138 out from intermeshing engagement with gear teeth 134, thereby permitting rotation of adaptor body 132 about second pivot axis 26.

When lock gears 138 are intermeshed with gear teeth 134, adaptor body 132 is locked from relative rotation with second pivot housing 146. Release of lock gears 138 from engagement with gear teeth 134 frees adaptor body 132 to rotate about second pivot axis 26 with respect to pivot housing 146. Release members 140 may be guided to an extent by second pivot housing 146, which will be described in greater detail hereinbelow.

Adaptor body 132 may be secured to base plate 28 in fixed relationship therewith, such that rotational movement of gear plate 132 correspondingly results in rotational movement of base plate 28 relative to pivot housing 146. Adaptor body 132 may be rotatably secured to pivot housing 146 via a connector 149 that may permit rotation with a slip washer, a bearing, or other known rotation means about a shaft.

Second pivot joint 16 further includes a second multiple-axis gimbal 150 for rotation about second gimbal axes, such as axes x, y, z. Second gimbal 150 may be in the form of a ball and socket joint, with ball 152 pivotally secured at least partially within pivot housing 146. In preferred embodiments, pivot housing 146 includes first and second shell portions 147a, 147b that are secured together with a bolt or locking shaft 154. In this manner, an engagement between ball 152 and pivot housing 146 may be adjusted by tightening or loosening bolt 154. Frictional resistance to pivoting movement of ball 152 with respect to pivot housing 146 may accordingly be selectively adjusted by the user. Preferably, bolt 154 threadably engages with threaded opening 156 in second shell portion 147b to move first and second shell portions 147a, 147b with respect to one another, and to correspondingly adjust the frictional resistance to pivotal movement of ball 152 with respect to pivot housing 146. Frictional resistance may be adjusted to an extent to which spontaneous movement of ball 152 with respect to pivot housing 146 under gravitational force is prevented. This locking mechanism is preferably effective even when an electronic device is mounted at base plate 128. In some embodiments, frictional resistance may be adjusted to an extent to which movement of ball 152 with respect to pivot housing 146 under even moderate externally-applied force, such as from an external impact, is prevented. The extent of frictional resistance is preferably adjustable by the user through adjustment of bolt 154 received at threaded opening 156.

The pivoting degrees of freedom of ball 152 in pivot housing 146 is further enabled by bore 158, which has a cross-sectional diameter that is substantially greater than bolt shaft diameter. The resultant space between the bolt and ball 152 in bore 158 permits multiple degrees of pivoting freedom of ball 152 with respect to pivot housing 146. In particular, second gimbal 150 may be selectively permitted to pivot about multiple axes, including orthogonal second gimbal axes x, y, z. Through the relationship of ball 152, bolt 154, and pivot housing 146, second gimbal 150 may be selectively adjusted between a free condition that permits movement about multiple second gimbal axes, and a locked condition that restricts movement about the second gimbal axes. As described above, the locked condition may prevent movement about one or more of the second gimbal axes.

First mount body 22 is fastenable to second mount body 24 with one or more fasteners 70 received in respective slotted openings 72. Preferably, the first and second mount bodies 22, 24 are positionable to bracket or sandwich post 8 therebetween, wherein fasteners 70 are operable to draw first and second mount bodies 22, 24 toward one another so as to frictionally engage with and fasten to post 8. Fasteners 70 may include formations 71 for restricting rotation relative to first body 22 when received in respective slotted openings 72. An example formation 71 is a hexagonal head that is configured for engagement with opposing walls of slotted openings 72 when the fastener 70 is received therein.

First and second mount bodies 22, 24 each have a length axis 74, a width axis 76 perpendicular to length axis 74, a brace surface 78, and a generally opposed outer surface 80 defining a mount body thickness 82 between brace surface 78 and outer surface 80. Length axis 74 defines a length 84, and width axis 76 defines a width 86 of each of first and second mount bodies 22, 24. Length 84 may be greater than width 86. Length axis 74 and width axis 84 together define quadrants 90a, 90b, 90c, and 90d of each of first and second mount bodies 22, 24.

Slotted openings 72 are configured to receive a fastener 70 therein for securing first and second mount bodies 22, 24 to post 8. Slotted openings may be through-apertures extending through thickness 82, or may instead form receptacles extending only partially through thickness 82. An aspect of the present invention is the adaptability of mounting apparatus 10, and particularly mount 20, to posts 8 of various shape and size. The adaptability is facilitated by the shape and orientation of slotted openings 72, the relative positioning of slotted openings 72 with respect to one another, and the configuration of first and second mount bodies 22, 24. In the illustrated embodiment, first and second mount bodies 22, 24 each include four slotted openings 72, with one slotted opening 72a, 72b, 72c, 72d in each quadrant 90a, 90b, 90c, 90d. Each slotted opening 72 defines a path 73 along which the fastener 70 is adjustably positionable.

Because path 73 is longer than the diameter of fastener 70, the position of fastener 70 within slotted opening 72 may be adjusted. At least a portion of path 73 is oriented skew with respect to both length axis 74 and width axis 76 so that adjustment of the position of fastener 70 within slotted opening 72 changes the spacing between fasteners 70. Preferably, mount 20 is secured to post 8 with fasteners 70 abutting post 8 to limit or prevent movement of mount 20 with respect to post 8. Adjustment of the spacing between fasteners 70 permits a customization of the overall fastener spacing to accommodate posts 8 of various size and shape.

Figure 11:
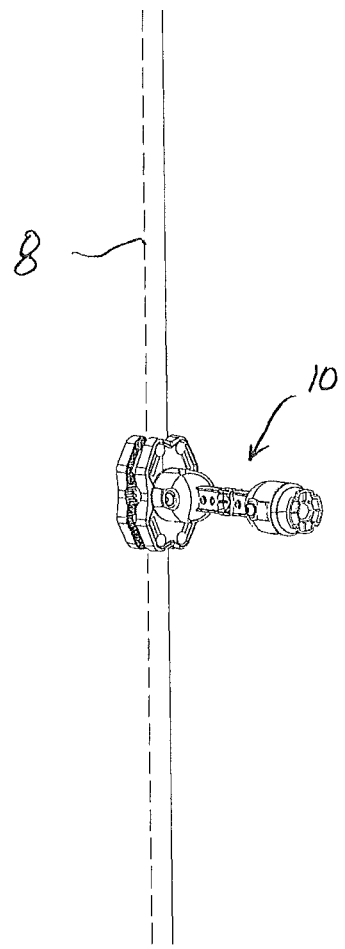
FIG. 11 is an illustration of a mounting apparatus of the present invention secured to a post.

By way of example, FIG. 1 illustrates first and second mount bodies 22, 24 secured to a 4" cross-sectional diameter post 8 in a horizontal orientation with fasteners 70 positioned at respective first ends 92 of slotted openings 72. This arrangement represents a maximum fastener spacing. By contrast, FIG. 11 illustrates first and second mount bodies 22, 24 secured to a 1" cross-sectional diameter post 8 in a vertical orientation with fasteners positioned at respective first ends 92 of slotted openings 72. This arrangement represents a minimum fastener spacing for first and second mount bodies. It should be recognized that a variety of combinations of fastener spacing is available by incrementally adjusting a location of fasteners 70 within slotted openings 72, as well as by selectively orienting first and second mount bodies 22, 24 with length axis 74 or width axis 76 parallel to a post axis.

Fasteners 70 may be threaded bolts with threaded nuts or threaded fixtures. In some embodiments, the threaded nuts may be seated at a respective first and second mount body 22, 24 to be rotationally fixed while the respective bolt is threadably engaged therewith.

Brace surface 78 of first and second mount bodies 22, 24 may be provided with one or more features to aid in grasping and otherwise engaging with post 8, as well as to diminish the transmission of vibrations. In some embodiments, at least a portion of first and/or second mount bodies 22, 24, including brace surface 78 includes a covering material such as an elastomer or other suitable material that provides a compliant and vibration-reducing surface. Brace surface 78 may exhibit a hardness that is desirable for enhancing engagement to post 8. In some embodiments, brace surface 78 exhibits a hardness of between 90 Shore A and 70 Shore D.

Brace surface 78 may further exhibit a surface roughness 94 for enhancing grip to post 8. In the illustrated embodiment, surface roughness 94 may comprise an array of spaced apart protrusions 95. In some embodiments, protrusions 95 exhibit a hardness of between 90 Shore A and 70 Shore D. Other configurations for surface roughness 94 are also contemplated by the present invention, including various patterns and combinations of grooves, recesses, and protrusions.

Base plate 28 may be fixedly secured to adaptor body 132 so that mounting apparatus is adaptable to both the AMPS standard mounting pattern (four holes located in a rectangular pattern spaced at 30.17 mm×38.05 mm) and the VESA standard mounting pattern (four holes located in a square pattern spaced at either 75 mm each or 100 mm each). Adaptor body 132 includes apertures or recesses 133 that set in an AMPS standard spaced array. Base plate may be secured to the AMPS standard array 133 of adaptor body 132 at mounting features 96. Base plate 28 preferably includes one or more sets of mounting features 98 that are set in the VESA standard spacing array. As such, electronic devices 30 compliant with one of these standards may be mounted either to adaptor body 132 or to base plate 28.

Figure 12:
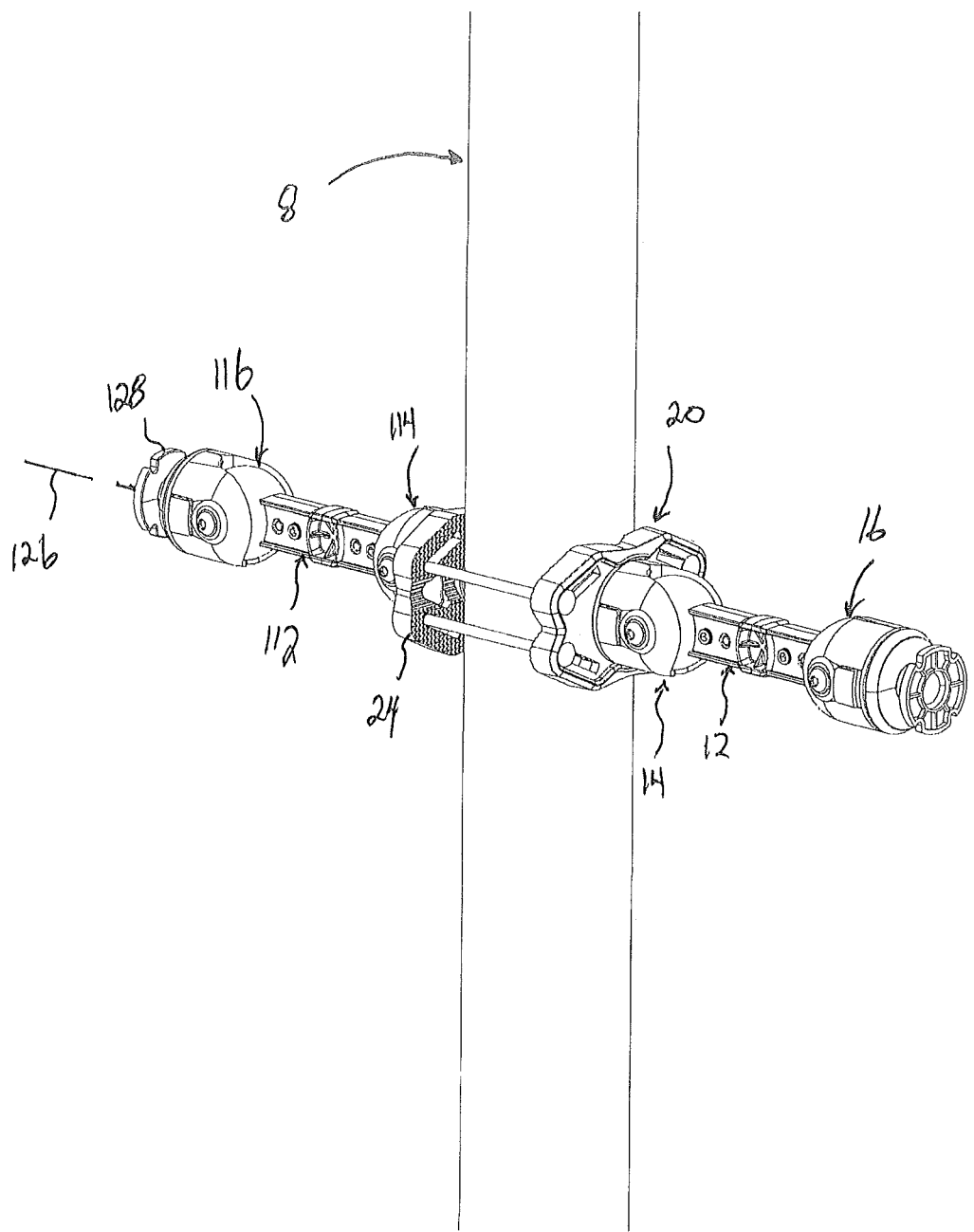
FIG. 12 is an illustration of a mounting apparatus of the present invention secured to a post.

As illustrated in FIG. 12, mounting apparatus 10 may include a second arm 112 extending between a third pivot joint 114 and a fourth pivot joint 116. Third pivot joint 114 is rotatably connected about a third pivot axis 118 to second body 24 of mount 20. Fourth pivot joint 116 is rotatably connected about a fourth pivot axis 126 to a base plate 128 that is specifically configured for removable connection to an electronic device 130. In this embodiment, a single mount 20 may adjustably support two electronic devices 30, 130.

The invention has been described herein in considerable detail in order to comply with the patent statutes, and to provide those skilled in the art with the information needed to apply the novel principles and to construct and use embodiments of the invention as required. However, it is to be understood that various modifications can be accomplished without departing from the scope of the invention itself.

The invention claimed is:

1. An adjustable mounting apparatus for an electronic device, comprising:
    a first coupler securable to a post;
    a first pivot joint rotatably connected to the first coupler about a first pivot axis and including a first gimbal that is movable about a plurality of first gimbal axes, the first gimbal having an inner gimbal member with a curved outer surface and an outer gimbal shell at least partially enclosing the inner gimbal member, the first gimbal further including a tensioner for adjusting an engagement between the outer gimbal shell and the curved outer surface of the inner gimbal member to selectively adjust frictional resistance to movement of the inner gimbal member with respect to the outer gimbal shell, the tensioner extending through a bore in the inner gimbal member; and
    a second coupler that is movable with the first gimbal and securable to the electronic device,
    wherein a bore wall defines the bore in the inner gimbal member, and wherein a space between the bore wall and the tensioner permits movement of the inner gimbal member about the plurality of first gimbal axes.

2. The adjustable mounting apparatus as in claim 1 wherein the tensioner is threadably receivable in the outer gimbal shell.

3. The adjustable mounting apparatus as in claim 2 wherein the outer gimbal shell includes first and second shell portions that are movable with respect to one another by the tensioner.

4. The adjustable mounting apparatus as in claim 1 wherein the frictional resistance to movement of the inner gimbal member with respect to the outer gimbal shell is adjustable between a free condition that permits movement about the first gimbal multiple axes, and a locked condition that restricts movement about the first gimbal multiple axes.

5. The adjustable mounting apparatus as in claim 1, including an arm supported by the first gimbal.

6. The adjustable mounting apparatus as in claim 5 wherein the arm connects the second coupler to the first gimbal.

7. The adjustable mounting apparatus as in claim 6 wherein the arm connects the first gimbal to a second pivot joint that is pivotably connected to the second coupler about a second pivot axis.

8. The adjustable mounting apparatus as in claim 7, wherein the second pivot joint includes a second gimbal that is movable about a plurality of second gimbal axes, and wherein the arm connects the first gimbal to the second gimbal.

\* \* \* \* \*